(12) United States Patent
Fahrner et al.

(10) Patent No.: US 9,851,020 B2
(45) Date of Patent: Dec. 26, 2017

(54) HEATED VALVE

(71) Applicant: Goodrich Corporation, Charlotte, NC (US)

(72) Inventors: Alan J. Fahrner, Canton, OH (US); Rick Pudoka, Uniontown, OH (US)

(73) Assignee: Goodrich Corporation, Charlotte, NC (US)

(*) Notice: Subject to any disclaimer, the term of this patent is extended or adjusted under 35 U.S.C. 154(b) by 20 days.

(21) Appl. No.: 14/567,155

(22) Filed: Dec. 11, 2014

(65) Prior Publication Data

US 2016/0169411 A1    Jun. 16, 2016

(51) Int. Cl.
F16K 49/00    (2006.01)
B64D 13/06    (2006.01)
B64D 15/04    (2006.01)
B64D 15/12    (2006.01)

(52) U.S. Cl.
CPC ............ *F16K 49/002* (2013.01); *B64D 15/04* (2013.01); *B64D 15/12* (2013.01); *B64D 2013/0607* (2013.01); *Y10T 137/6606* (2015.04)

(58) Field of Classification Search
CPC . Y10T 137/6606; F16K 49/002; B64D 15/02; B64D 15/04; B64D 15/12; B64D 2013/0603; B64D 2013/0607; B64D 2013/0618
USPC .......................... 137/341; 219/641; 392/474
See application file for complete search history.

(56) References Cited

U.S. PATENT DOCUMENTS

| | | | | |
|---|---|---|---|---|
| 75,670 A * | 3/1868 | Douglas | ............. | F16K 31/0655 137/906 |
| 726,575 A * | 4/1903 | Rothchild | ......... | F16K 31/52408 251/247 |
| 2,556,557 A * | 6/1951 | Schweitzer, Jr. | ..... | F16K 49/002 137/341 |
| 3,050,608 A | 8/1962 | De Woody | | |
| 3,195,552 A * | 7/1965 | Rasmussen | ............. | F16K 49/00 137/315.27 |
| 3,211,169 A * | 10/1965 | Webb | ...................... | F16K 51/02 137/340 |
| 3,562,455 A * | 2/1971 | McQueen | ............ | H01H 35/405 137/341 |
| 3,580,267 A * | 5/1971 | Baker | ...................... | F16L 55/00 137/203 |
| 4,161,647 A * | 7/1979 | Carbonnel | ............. | B22D 18/00 137/341 |
| 4,456,186 A * | 6/1984 | Ando | ....................... | B01J 3/002 137/341 |

(Continued)

FOREIGN PATENT DOCUMENTS

DE    102012208243 A1    11/2013
WO    WO03021087 A1    3/2003

OTHER PUBLICATIONS

Extended European Search Report for European Application No. 15195997.0, dated Apr. 29, 2016, 8 pages.

*Primary Examiner* — Jessica Cahill
*Assistant Examiner* — Jonathan Waddy
(74) *Attorney, Agent, or Firm* — Kinney & Lange, P.A.

(57) ABSTRACT

A valve includes a body with an inlet at a first end of the body, and an outlet at a second end of the body. A first electrically resistive heating element is located in the inlet and heats a first fluid source to a temperature above 0 degrees C. A second electrically resistive heating element is located in the outlet and heats a second fluid source to a temperature above 0 degrees C.

4 Claims, 4 Drawing Sheets

(56) References Cited

U.S. PATENT DOCUMENTS

| | | | | |
|---|---|---|---|---|
| 4,831,819 A * | 5/1989 | Norris | F02C 7/047 | 244/134 R |
| 5,022,611 A * | 6/1991 | Weisend, Jr. | B64D 15/166 | 244/134 A |
| 5,222,356 A * | 6/1993 | Evenson | F02C 7/057 | 415/26 |
| 5,813,631 A | 9/1998 | Butler et al. | | |
| 5,915,410 A * | 6/1999 | Zajac | F16K 1/54 | 137/341 |
| 6,227,236 B1 * | 5/2001 | Kusumoto | F16K 31/047 | 118/620 |
| 6,321,780 B1 * | 11/2001 | Iwabuchi | F16K 31/04 | 137/341 |
| 6,595,432 B2 * | 7/2003 | Stemmler | B60H 1/00485 | 137/341 |
| 6,668,854 B2 * | 12/2003 | Fukuda | F16K 49/002 | 137/338 |
| 7,763,833 B2 | 7/2010 | Hindel et al. | | |
| 8,196,893 B2 * | 6/2012 | Grout | F16K 1/36 | 137/375 |
| 8,334,486 B2 | 12/2012 | Hogate | | |
| 2005/0006489 A1 | 1/2005 | Meyer et al. | | |
| 2007/0098992 A1 | 5/2007 | Hasegawa et al. | | |
| 2007/0209710 A1 * | 9/2007 | Gottsmann | F16K 49/002 | 137/341 |
| 2008/0105843 A1 * | 5/2008 | Koenekamp | F16K 49/002 | 251/231 |
| 2009/0114296 A1 * | 5/2009 | Tsuda | F16K 11/044 | 137/613 |
| 2013/0340846 A1 * | 12/2013 | Peel | F17D 1/00 | 137/341 |
| 2014/0224934 A1 | 8/2014 | Fahrner | | |

* cited by examiner

HEATED VALVE

BACKGROUND

During operation, aircraft face an undesirable risk of ice accretion on forward facing components such as the leading edge of airfoils such as wings. Ice that forms on airfoil components can cause drag, loss of lift, and added weight. In order to avoid such problems, it is desired to provide an ice protection system that reduces ice formation on airfoil surfaces while also maintaining relatively low power expenditures by the ice protection system One such ice protection system is pneumatic de-icing.

In particular, pneumatic valves used in pneumatic de-icing systems are subject to freezing when the bleed air supplied from the engines has had insufficient moisture removal as the bleed air travels to the pneumatic valves. The pneumatic valves are typically located in unheated areas of the aircraft, and are frequently located such that they are the lowest point in the de-icing system to drain accumulated moisture. When the pneumatic valve is most required to function, in ambient temperatures below freezing, the valve may be subject to freezing and rendering the de-icing system inactive.

SUMMARY

A valve includes a body with an inlet at a first end of the body, and an outlet at a second end of the body. A first electrically resistive heating element is located in the inlet and heats a first fluid source to a temperature above 0 degrees C. A second electrically resistive heating element is located in the outlet and heats a second fluid source to a temperature above 0 degrees C.

A method of heating a fluid includes integrating electrically resistive heating elements into a valve. Electrically resistive heating elements are inserted in the valve at locations that are susceptible to accumulation of moisture and/or ice. The electrically resistive heating elements are electrically connected to a power source.

DETAILED DESCRIPTION

In the past, some pneumatic valves have been heated by a placing a cartridge heater in the body of the valve, heating the entire body of the valve to keep the fluid passages from freezing. The generated heat is greatest at the point of the heater, which is generally not located near the fluid passages. This cartridge heater method still allows sections of the valve to freeze if the available power and heater capability are insufficient to overcome ambient temperature. An alternate method is to heat the outside of the valve, wrapping the valve body in a silicone heater (or other heating material). Without adequate insulation and good contact between the heater and the valve body, the majority of the heat goes to the surrounding air. As with most aircraft applications, available power is at a premium and the power required to heat the entire valve body through these methods may not be available.

A heated valve of the present disclosure prevents potential freeze-up, or non-functioning of a valve. With the valve functioning, it allows the entire system to function as designed. The valve of the present disclosure also reduces the power required to prevent icing by applying heat directly to the areas needed, instead of heating the entire valve body and surrounding elements. The valve of the present disclosure will focus heat where it is most needed to prevent freezing of the valve while minimizing the power required to perform the heating. The electrically resistive heating elements may share the same electrical connector that provides power for the other sections of the valve, therefore decreasing the cost of additional electrical elements.

Figure 1:
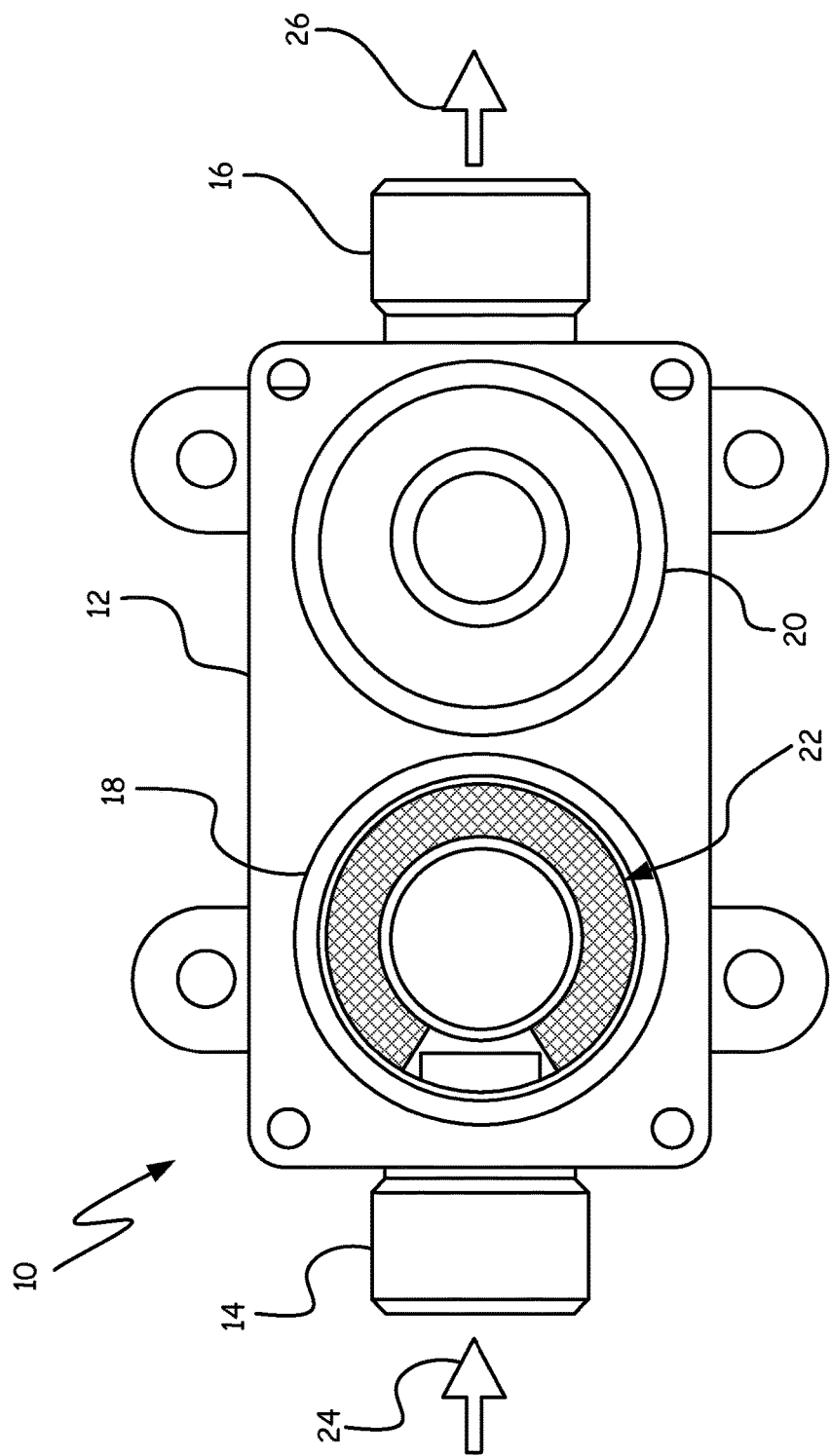
FIG. 1 is a top cross-sectional view of a pneumatic valve.

FIG. 1 is a top cross-sectional view of pneumatic valve 10. Pneumatic valve includes valve body 12, valve inlet 14, valve outlet 16, valve poppet chamber 18, and second chamber 20. Valve inlet 14 is in fluid communication with valve poppet chamber 18, and valve poppet chamber 18 is in fluid communication with valve outlet 16. Pneumatic valve 10 also includes electrically resistive heating element 22, which is located within valve poppet chamber 18. Second chamber 20 is configured to house various electrical and control elements used to operate pneumatic valve 10.

Pneumatic valve 10 is included in a pneumatic de-icing system of an aircraft. Pneumatic valve 10 provides the pneumatic de-icing system control of the fluid in order to mechanically operate the surface of the pneumatic de-icing system. The de-icing surface functions by inflating and deflating with fluid from pneumatic valve 10 to expand and contract the de-icing surface, causing ice to break apart from the aero-surfaces of the aircraft. Pneumatic valve 10 directs fluid to the pneumatic de-icing system by receiving first fluid source 24 through valve inlet 14. Pneumatic valve 10 then passes the flow of gas through valve body 12, before expelling second fluid source 26 from valve outlet 16.

Pneumatic valve 10 is generally made of a material that is mechanically strong enough to withhold the pressure experienced by pneumatic valve 10. Some examples of materials for pneumatic valve 10 include metallic materials such as aluminum, titanium, and stainless steel, and other materials such as plastic. Additionally, pneumatic valve 10 can include an ejector flow control valve, a dual distribution valve, a pressure regulator, a check valve, or other similar types of pneumatic valves.

Valve inlet 14 is configured to receive first fluid source 24 from the engine of the aircraft. First fluid source 24 typically includes bleed air from the aircraft engine. Before reaching pneumatic valve 10, bleed air from the aircraft engine typically passes through a series of check valves, a regulator, a conditioner, and is then received by pneumatic valve 10.

Electrically resistive heating element 22 is located near the bottom of valve poppet chamber 18. Electrically resistive heating element 22 may be adhesively or mechanically attached to valve body 12, and an attachment means may include epoxy adhesive, pressure fit, or press fit method. Electrically resistive heating element 22 is configured to supply heat to localized areas within pneumatic valve 10, and in particular to supply heat to gas travelling from valve poppet chamber 18 through to valve outlet 16. Electrically resistive heating element 22 provides heat to the passing gas through conductive heating. Electrically resistive heating element 22 may contain multiple layers including a thermally insulating material, a flexible electrical resistance heater material, and a thermally conductive material. Electrically resistive heating element 22 is electrically connected to a power source to provide electrically resistive heating element 22 with the power necessary to provide conductive heating to the gas passing over electrically resistive heating element 22.

Figure 2:
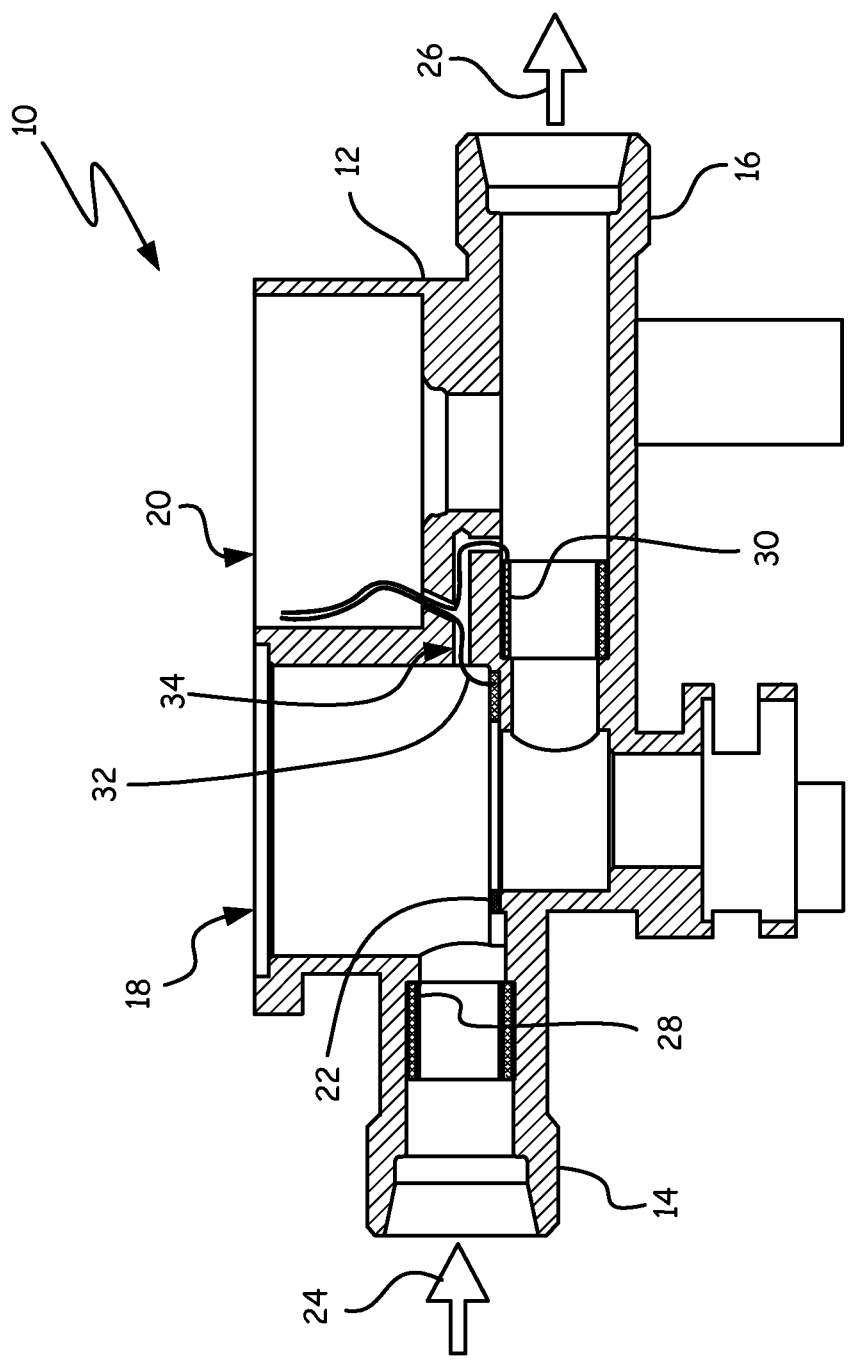
FIG. 2 is a side cross-sectional view of a pneumatic valve.

FIG. 2 is a side cross-sectional view of pneumatic valve 10. In addition to electrically resistive heating element 22, pneumatic valve 10 includes electrically resistive heating element 28 and electrically resistive heating element 30. Electrically resistive heating element 28 is located in valve inlet 14, and electrically resistive heating element 30 is located in valve outlet 16. Lead wires 32 electrically connect electrically resistive heating element 22 and electrically resistive heating element 30 to a power source. Lead wires 32 are disposed in channels 34 which have been machined from valve body 12 to allow passage of lead wires 32. Channels 34 can be machined from valve body 12 after valve body 12 is manufactured, or channels 34 may be formed during the manufacturing process, such as through an additive manufacturing process. Lead wires 32 are secured in channels 34 with a mechanical or adhesive means, and the securing means may include epoxy, o-rings, or other similar types of sealing methods. Lead wires 32 need to be properly secured in order to prevent fluid leakage during proof and burst testing of pneumatic valve 10.

Electrically resistive heating element 28 and electrically resistive heating element 30 are both cylindrically shaped to fit within valve inlet 14 and valve outlet 16, respectively. The location of electrically resistive heating element 28 and electrically resistive heating element 30 enables heating in the specific locations of valve inlet 14 and valve outlet 16 where gas enters and exits valve body 12. Electrically resistive heating element 28 is configured to heat first fluid source 24 passing through valve inlet 14 to a temperature above 0 degrees C. Electrically resistive heating element 30 is configured to heat second fluid source 26 passing through valve outlet 16 to a temperature above 0 degrees C. The locations of electrically resistive heating element 28 and electrically resistive heating element 30 are used to prevent moisture and ice buildup in pneumatic valve 10, prevention of which enables pneumatic valve 10 to work properly. Without localized heating provided by electrically resistive heating element 22, electrically resistive heating element 28, and electrically resistive heating elements 30, one would be required to heat the entire valve body 12 through external heating methods which require a higher level of thermal energy and power to achieve the same result as through the use of localized electrically resistive heating elements.

Figure 3:
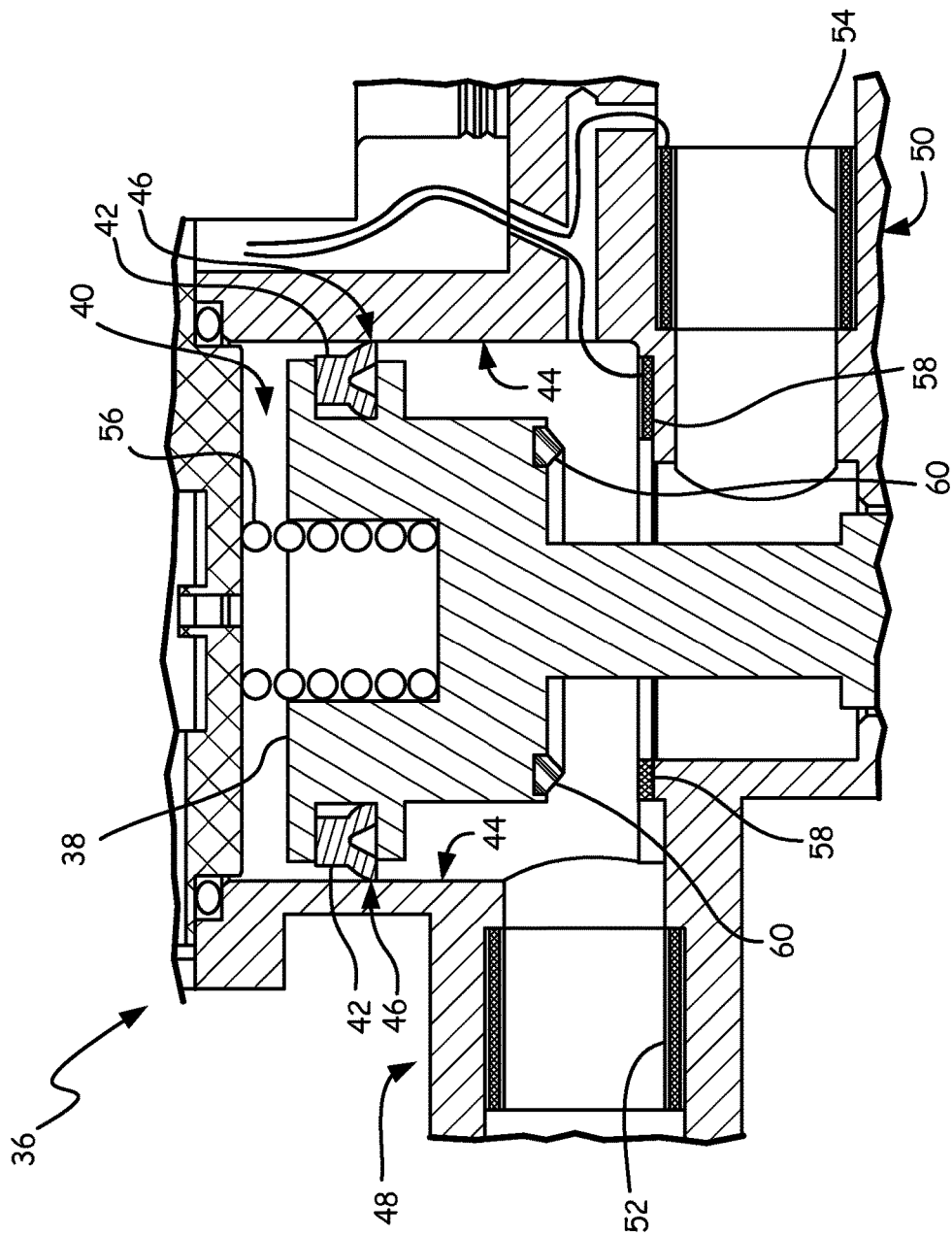
FIG. 3 is a partial side cross-sectional view of a pneumatic valve.

FIG. 3 is a partial side cross-sectional view of pneumatic valve 36 according to an alternative embodiment of the present disclosure. Pneumatic valve 36 includes valve poppet 38 located in valve poppet chamber 40. Valve poppet 38 includes plurality of seals 42. Plurality of seals 42 come into contact with interior walls 44 of valve poppet chamber 40 to form airtight compartments within valve poppet chamber 40. Plurality of seals 42 come into contact with interior walls 44 at a series of connection points 46.

FIG. 3 displays valve poppet in an open, or energized, position allowing fluid communication between valve inlet 48 and valve outlet 50. Valve poppet 38 can alternatively occupy a closed, or de-energized, positioned in which valve poppet 38 is pushed downward by spring element 56 in order to shut-off fluid communication between valve inlet 48 and valve outlet 50. Electrically resistive heating element 52 and electrically resistive heating element 54 are located in valve inlet 48 and valve outlet 50, respectively. Additional electrically resistive heating elements can be positioned throughout valve poppet chamber 40. For example, ring-shaped electrically resistive heating element 58 is located where seals 60 will come into contact with interior walls 44 of valve poppet chamber 40 when valve poppet 38 is lowered into a closed position.

Figure 4:
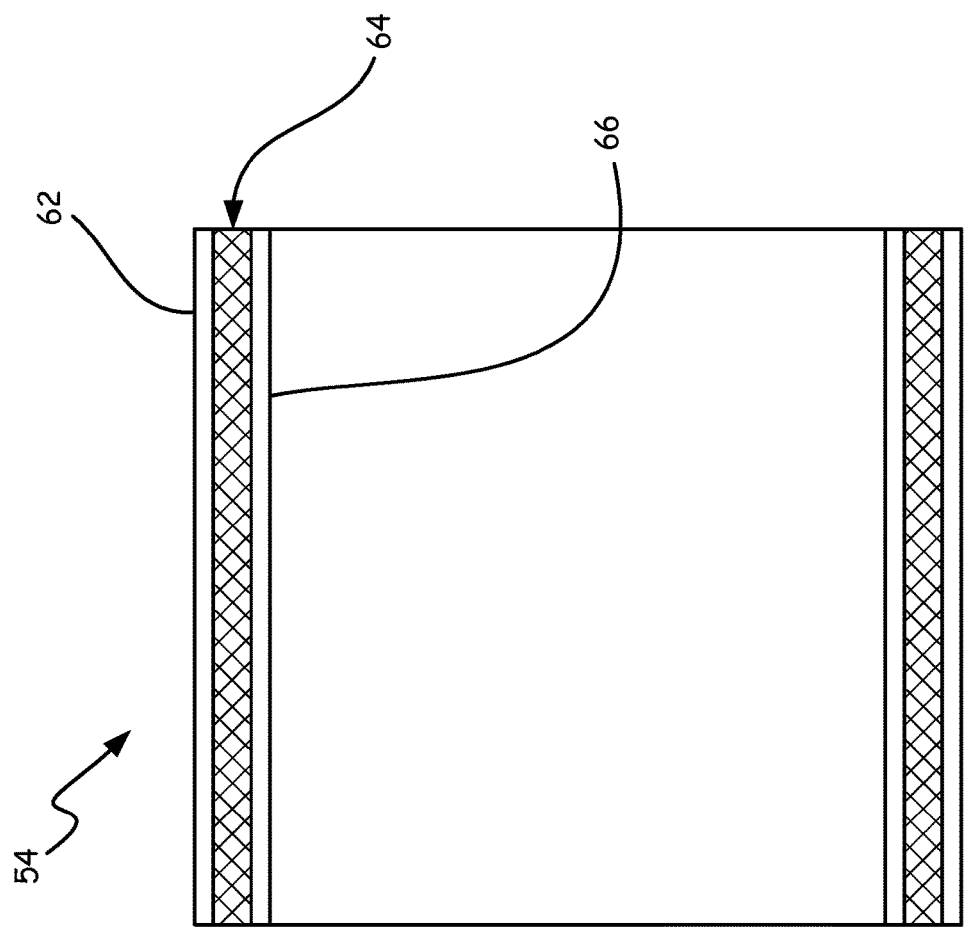
FIG. 4 is a side sectional view of an electrically resistive heating element.

FIG. 4 is a side sectional view of electrically resistive heating element 54. Electrically resistive heating element 54 contains three layers including thermally insulating material 62, flexible heater 64, and thermally conductive material 66. Thermally insulating material 62 reduces heating of those portions of the valve body that do not require heat. Thermally insulating material 62 can be made of a material designed to absorb thermal energy, and a material that also acts to prohibit transmission of thermal energy. Flexible heater 64 becomes thermally energized and provides thermal energy to thermally conductive material 66. The material of flexible heater 64 may include any electrically conductive metallic or carbon based material, such as copper, stainless steel, or resistance wire. Thermally conductive material 66 transfers the thermal energy of flexible heater 64 to the gas passing over the surface of thermally conductive material 66. Thermally conductive material 66 can be made out of a material with a desired thermal conductivity, typically a high level of thermal conductivity. Electrically resistive heating elements 22, 28, 30, 52, and 58 may also include a similar construction as that provided for electrically resistive heating element 54. Additionally, any of the electrically resistive heating elements discusses herein may include more or less than three layers, and may also include multiple flexible heater layers and constructions.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A valve may include a body with an inlet at a first end of the body, and an outlet at a second end of the body. A first electrically resistive heating element may be located in the inlet and can heat a first fluid source to a temperature above 0 degrees C. A second electrically resistive heating element may be located in the outlet and can heat a second fluid source to a temperature above 0 degrees C.

The valve of the preceding paragraph can optionally include, additionally and/or alternatively, any one or more of the following features, configurations and/or additional components.

The first and second fluid sources may include a gas. The valve may be a pneumatic valve used in a pneumatic de-icing system for an aircraft. The first fluid source may include bleed air from a turbine engine of an aircraft. Both of the electrical resistive heating elements may include a thermally insulating material, a flexible heater, and a thermally conductive material. The valve body may include a poppet chamber with interior walls, and poppet positioned inside of the poppet chamber. The poppet may enable regulation of fluid communication between the inlet and outlet. A plurality of seals may be disposed in the poppet and positioned to enable contact with the interior walls of the poppet chamber at a series of connection points. The valve body may further include one or more additional electrically resistive heating elements that may be disposed in the interior walls of the poppet chamber and positioned adjacent to at least one of the series of connection points.

A method of heating a fluid may include integrating electrically resistive heating elements into a valve. Electrically resistive heating elements may be inserted in the valve at locations susceptible to accumulation of moisture and/or ice. The electrically resistive heating elements may be electrically connected to a power source.

The method of heating a gas of the preceding paragraph can optionally include, additionally and/or alternatively, any one or more of the following features, configurations and/or additional components.

The fluid may be a gas. The valve may be positioned within a pneumatic de-icing system for an aircraft. Obtaining the valve may further include designing a pneumatic valve to include electrically resistive heating elements. Obtaining the valve may also include manufacturing the valve. The electrically resistive heating elements may be positioned in a valve inlet, a valve outlet, and/or in an interior wall of a valve poppet chamber.

The invention claimed is:

1. A pneumatic valve comprising:
   a valve body;
   an inlet disposed in a first end of the valve body;
   an outlet disposed in a second end of the valve body;
   a poppet chamber within the valve body, the poppet chamber including interior walls, wherein the poppet chamber is in fluid communication with the inlet and the outlet;
   a poppet positioned inside of the poppet chamber, the poppet enabling regulation of air flow between the inlet and the outlet;
   a plurality of seals disposed on the poppet and positioned to enable contact with the interior walls of the poppet chamber at a series of connection points;
   a first tubular heater with a first radially outer-most layer comprising a first thermally insulating material, a first radially inner-most layer comprising a first thermally conductive material, and a first electrically resistive heating element layer disposed radially between the first radially outer-most layer and the first radially inner-most layer, further wherein the first tubular heater is disposed within and along a radially inner-most surface of the inlet such that the first radially outer-most layer engages with the radially inner-most surface of the inlet, wherein the first tubular heater heats air passing through the inlet to a temperature above 0 degrees C.;
   a second tubular heater with a second radially outer-most layer comprising a second thermally insulating material, a second radially inner-most layer comprising a second thermally conductive material, and a second electrically resistive heating element layer disposed radially between the second radially outer-most layer and the second radially inner-most layer, further wherein the second tubular heater is disposed within and along a radially inner-most surface of the outlet such that the second radially outer-most layer engages with the radially inner-most surface of the outlet, wherein the second tubular heater heats air passing through the outlet to a temperature above 0 degrees C.; and
   a third, ring-shaped, heater with a third thermally insulating material layer, a third thermally conductive material layer, and a third electrically resistive heating element disposed between the third thermally insulating layer and the third thermally conductive layer, wherein the third, ring-shaped, heater is disposed along an inner surface of at least one of the interior walls of the poppet chamber such that the third thermally insulating material is engaged with the inner surface of the interior wall of the poppet chamber and at least one of the plurality of seals comes into contact with the third heater when the poppet is in a closed position.

2. The pneumatic valve of claim 1, wherein the valve is connected in a pneumatic de-icing system.

3. The pneumatic valve of claim 2, wherein the pneumatic de-icing system is used in an aircraft.

4. The pneumatic valve of claim 1, wherein the air is bleed air from a turbine engine of an aircraft.

* * * * *